G. O. Lackey.
Horse Rake.

No. 107,183.   Patented Sep. 6, 1870.

Geo. W. Raff.
And. Choffin.
Witnesses.

G. O. Lackey, Inventor.
by Job Abbott, Attorney.

UNITED STATES PATENT OFFICE.

GASWAY O. LACKEY, OF AKRON, OHIO.

Letters Patent No. 107,183, dated September 6, 1870.

IMPROVEMENT IN HORSE HAY-RAKES.

The Schedule referred to in these Letters Patent and making part of the same.

*To all whom it may concern:*

Be it known that I, GASWAY O. LACKEY, of Akron, Summit county, Ohio, have invented certain new and useful Improvements in Horse Hay-Rakes; and I do hereby declare that the following is a full, clear, and exact description of my invention, reference being had to the accompanying drawing forming a part of this specification and to the letters of reference marked thereon, of which drawing—

My invention relates to the arrangement of a U-shaped tension-spring for holding down the rake-teeth in the rear of and parallel with the rake-head, and underneath a grooved bar secured to the rear of the rake-head, whereby the said spring is brought into a position in which it is out of the way and not liable to be broken, and a very cheap and efficient mode of securing said springs to the rake-head is obtained.

To enable others skilled in the art to make and use my invention, I will proceed to describe its construction and operation.

In the rake represented in the accompanying drawing, the rake-axle C serves as the head-rake, and is arranged to turn in the hubs of the wheels B B, on which it is supported.

The rake-thills, consisting of the shafts $a$ $a$, united by the cross-bars $b$ $b$, are attached by the hinged couplings Z Z to the rake-axle C, and have the driver's seat S secured on them by the standards T T, as shown.

Figure 1:
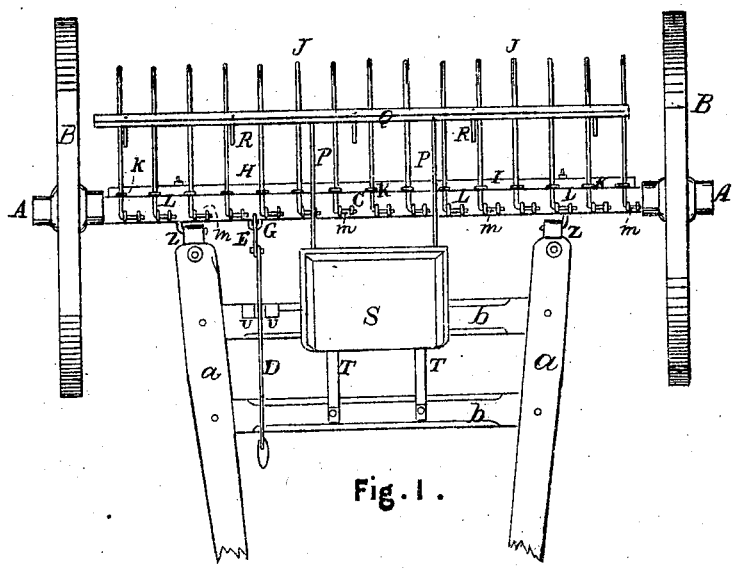
Figure 1 is a plan of my rake.

The rake-teeth J J are made of steel or iron wire, curved into the form shown, and their upper ends are bent at right angles to the plane of the tooth, so as to form a pivot arm, $m$, which arm fits in staples L L in the rake-head C, as shown in fig. 1.

Figure 3:
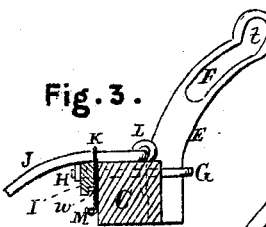
Figure 3 is a detail view of the rake-head, slotted arm, and mechanism for holding the teeth.
Figure 4:
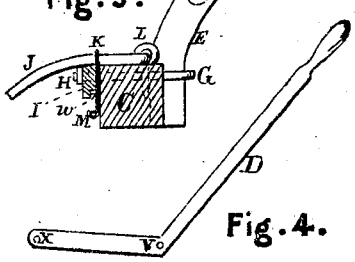
Figure 4 is a side view of bent lever.

The bar I is secured to the rear face of the rake-head C, and the groove $w$ is formed on its lower edge, next to the rake-head, as shown in fig. 3.

This groove $w$ can be of considerable depth, if desired, so as to allow the bar I to come down over the spring M, and cover them up on the rear, by which the hay will be prevented from clogging up the springs in case of raking a very heavy windrow, and said groove can be formed either by planing it into the bar or by making the bar of two pieces of different widths, as may be found most desirable.

Figure 5:
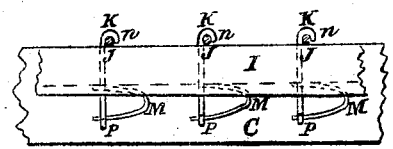
Figure 5 is a rear view of the rake-head, showing the springs and tension-rods for the teeth.

The tension-rods K K are arranged in holes in the bar I, and have the hooks $n$ formed on their upper ends, which hooks rest over the rake-teeth J, as shown in figs. 3 and 5.

Figure 6:
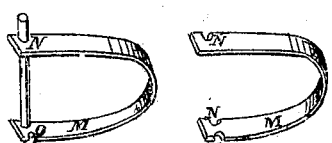
Figures 6 are perspective views of the tension-spring, showing mode of attaching the tension-rod.

The spring M is of a U-form, and of a width not greater than that of the groove $w$ in the bar I, and on the inner sides of its arms are cut the notches N N, while a single notch, O, is cut on the outer side of its lower arm, as shown in right-hand figure in fig. 6.

The hooks $p$ are formed at the lower ends of the tension-rods K, at right angles to the plane of the hooks $n$, so that, when the upper ends of said rods, so that, when the hooks $n$ are hooked over the teeth J, as shown in fig. 5, the plane of the hooks $p$ will be at right angles with the rake-head C, from which it is evident that the springs M may then be put in position by first putting the upper arm in the groove $w$, so that the notch N will fit over the rod K, and then springing the arms of the spring together, and pushing in the lower arm until the lower notches N and O are brought over the hook $p$, thus bringing the spring into the position shown in fig. 5, and locking the springs under the bar I and onto the tension-rod K, as indicated by left-hand figure in fig. 6.

The clearer Q consists of a straight bar of wood, which rests on the teeth J J, and is provided with prongs R R, which extend down between the teeth J.

Figure 2:
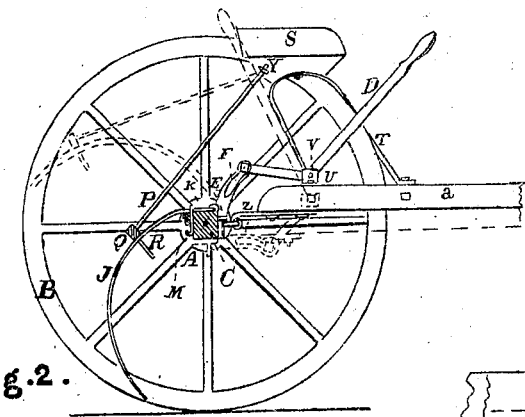
Figure 2 is a side view of the same with one wheel cut off.

The rods P P extend from the clearer Q to the seat-pieces Y Y, to which they are hinged by staples, as shown in figs. 1 and 2.

The rake-arm E is secured to the rake-head C by the staple G, or in any other suitable manner, and in it is formed the slot F, the upper part $t$ of which is made at a sharp upward angle with the lower part of the slot, as shown in fig. 3.

The bent lever D is pivoted at V to the post U on the cross-bar $b$ of the thills, and at its lower end is the bolt X, which slides in the slot F in the rake-arm E.

The form of the rake-arm E, the length of the arm V X of the bent lever D, and the position of the post U with respect to the rake-arm E, are so adjusted as that, when the bolt X is in the upper part $t$ of the slot F, the teeth J J shall be on the ground in the proper position for raking, as shown in fig. 2.

The several parts being in the position just shown, it is evident that the rake will be locked down to its work, for the weight of the long arm of the bent lever D will keep the bolt X slid up to the upper part $t$ of the slot F, and, as this part of the slot makes a sharp angle with the lower part, and is consequently nearly at right angles with the line of movement of the bolt X down the slot F in raising the rake, the strain due to the resistance of the hay to the forward movement of the teeth in raking will only cause the bolt X to ress up to the top of the part $t$ of the slot F, and the rake will be thus held down.

Now, if the driver wishes to raise the rake, he grasps the end of the bent lever D, and draws it toward him, which forces down the other arm of the lever, and causes the bolt X to slide down the slot F, thus forcing down the arm E, which causes a rotation of the rake-head C, and raises the rake-teeth J from the ground.

By continuing this backward movement of the lever D until the parts are brought into the position indicated by dotted lines in fig. 2, the bolt X will be slid into the part $t$ of the slot F, when it is evident that the rake will be locked in its raised position, in a manner similar to that described in the locked position for raking.

When it is desirable to remove a tooth, the operator raises the tension-rod K until the hook N is clear of the tooth, when it is evident that the tooth may be drawn sidewise until the pivot-arm $m$ is removed from the staples L, which frees the tooth from the rake-head.

The mode of removing a spring, M, is too evident from the foregoing description to require particular mention.

It is evident that this construction of rake-teeth, and tension-rod, and spring, and also of the slotted arm and bent lever, are equally applicable to rakes having a rake-head separate from the rake-axle, and in which the thills are fixed, instead of being hinged to the rake-axle.

Having thus fully described my improved rake,

What I claim therein as new and of my invention, and desire to secure by Letters Patent, is—

1. The combination of the bar I, provided with the groove $w$ along its lower front edge, rake-head C, U-shaped tension-spring M, arranged in the rear of and parallel to the rake-head, tension-rod K, and pivoted metallic tooth J, the several parts being arranged as and for the purpose specified.

2. The combination of the rake-tooth J, provided with the pivot-arm $m$, tension-rod K, provided with the hooked ends $n$ $p$, and the tension-spring M, provided with the notches N N O, and resting in the groove $w$ of the bar I, the several parts being constructed and arranged as and for the purpose specified.

As evidence that I claim the foregoing, I have hereunto set my hand in the presence of two witnesses, this 15th day of January, 1870.

G. O. LACKEY.

Witnesses:
G. T. FORD,
E. P. GREENE.